(12) United States Patent
Burgher et al.

(10) Patent No.: US 11,804,142 B2
(45) Date of Patent: Oct. 31, 2023

(54) SIMULATION OF VISUAL IMPAIRMENT

(71) Applicant: VIRTUAL REALITY EMPATHY PLATFORM LIMITED, Galashiels Borders (GB)

(72) Inventors: David Burgher, Galashiels Borders (GB); Kevin Gordon, Galashiels Borders (GB)

(73) Assignee: Virtual Reality Empathy Platform Limited, Dundee (GB)

( * ) Notice: Subject to any disclaimer, the term of this patent is extended or adjusted under 35 U.S.C. 154(b) by 0 days.

(21) Appl. No.: 17/598,752

(22) PCT Filed: Mar. 30, 2020

(86) PCT No.: PCT/GB2020/050842
§ 371 (c)(1),
(2) Date: Sep. 27, 2021

(87) PCT Pub. No.: WO2020/193994
PCT Pub. Date: Oct. 1, 2020

(65) Prior Publication Data
US 2022/0189330 A1    Jun. 16, 2022

(30) Foreign Application Priority Data
Mar. 28, 2019   (GB) ..................................... 1904343

(51) Int. Cl.
*G06F 3/01*        (2006.01)
*G09B 5/02*        (2006.01)
(Continued)

(52) U.S. Cl.
CPC ............... *G09B 5/02* (2013.01); *G06F 3/012* (2013.01); *G09G 3/003* (2013.01); *G09G 3/3208* (2013.01);
(Continued)

(58) Field of Classification Search
CPC .......... G09B 5/02; G06F 3/012; G09G 3/003; G09G 3/3208; G09G 2320/066;
(Continued)

(56) References Cited

U.S. PATENT DOCUMENTS 4,028,725 A    6/1977  Lewis
5,320,534 A    6/1994  Thomas
(Continued)

FOREIGN PATENT DOCUMENTS

CN         106781797      5/2017
EP         3179289        3/2016
(Continued)

OTHER PUBLICATIONS

International Search Report of Counterpart PCT International Application No. PCT/GB2020/050842.
(Continued)

*Primary Examiner* — Amare Mengistu
*Assistant Examiner* — Gloryvid Figueroa-Gibson
(74) *Attorney, Agent, or Firm* — LIU & LIU

(57) ABSTRACT

The present invention relates to apparatus for simulating visual impairment of a person 10. The apparatus for simulating visual impairment of a person 10 comprises a headset 14 and a position sensor 16. The headset 14 is worn by a user and displays a scene 20 to the user. The position sensor 16 senses the position of the headset. The headset 14 changes the scene 20 displayed to the user in dependence on an output from the position sensor 16. The headset 14 also changes an extent of obscuration of the scene 20 displayed to the user in dependence on an output from the position sensor 16.

20 Claims, 1 Drawing Sheet

(51) Int. Cl.
*G09G 3/00* (2006.01)
*G09G 3/3208* (2016.01)

(52) U.S. Cl.
CPC .............. *G09G 2320/066* (2013.01); *G09G 2320/0666* (2013.01); *G09G 2320/0686* (2013.01); *G09G 2354/00* (2013.01)

(58) Field of Classification Search
CPC ... G09G 2320/0666; G09G 2320/0686; G09G 2354/00
USPC ........................................................ 434/262
See application file for complete search history.

(56) References Cited

U.S. PATENT DOCUMENTS

| | | |
|---|---|---|
| 2004/0197750 A1 | 10/2004 | Donaher et al. |
| 2014/0200079 A1* | 7/2014 | Bathiche ............... A63F 13/25 348/54 |
| 2015/0316772 A1 | 11/2015 | Border et al. |
| 2016/0063893 A1 | 3/2016 | Kanuganti et al. |
| 2016/0131908 A1 | 5/2016 | Fateh |
| 2016/0133170 A1 | 5/2016 | Fateh |
| 2017/0336641 A1 | 11/2017 | von und zu Liechtenstein |
| 2018/0025521 A1* | 1/2018 | Allen ................... H04N 13/344 345/589 |
| 2018/0182093 A1* | 6/2018 | Gupta ...................... G06T 7/97 |
| 2022/0147139 A1* | 5/2022 | Canberk ................ G02C 11/10 |

FOREIGN PATENT DOCUMENTS

| | | |
|---|---|---|
| FR | 3037180 | 12/2016 |
| WO | 2017/059522 | 4/2017 |

OTHER PUBLICATIONS

Fortenbaugh et al., "A Technique for Simulating Visual Field Losses in Virtual Environments to Study Human Navigation", Behavior Research Methods, 2007, Psychonomic Society, Inc., 39 (3), pp. 552-560.

Delacour, Jacques, "Light and Human Vision Based Simulation Technology", RTO-MP-MSG-069, Oct. 2009, pp. 1-14.

* cited by examiner

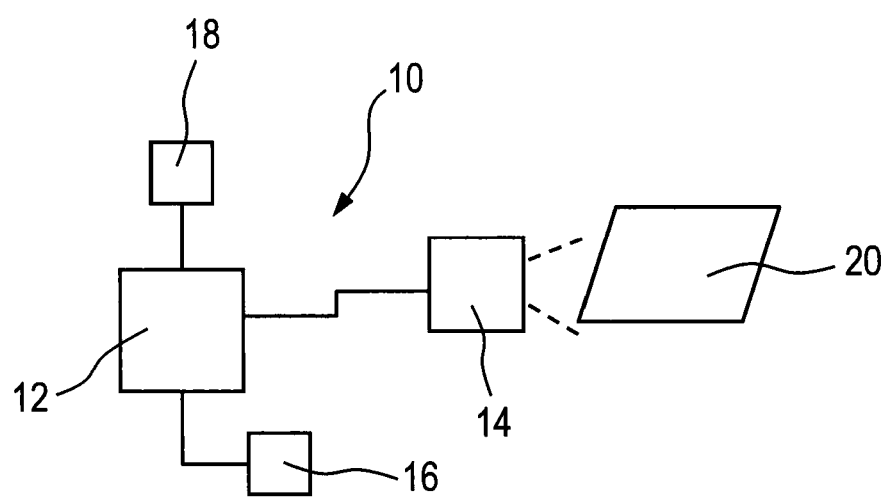

SIMULATION OF VISUAL IMPAIRMENT

FIELD OF THE INVENTION

The present invention relates to apparatus for and a method of simulating visual impairment of a person and, in particular but not exclusively, of a person suffering from an age related visual impairment.

BACKGROUND ART

The design of appropriate living spaces for persons with age related visual impairments requires sufficient appreciation on the part of the designer of the effect of the visual impairments. The gaining of sufficient appreciation may not be achieved readily by designers. Furthermore, re-design of inappropriately designed living spaces involves cost and delay.

Mindful of the difficulty in designing living spaces for persons with age related visual impairments the present inventors have devised an improved approach to the design of living spaces for persons with age related visual impairments. The improved approach is alternatively applicable in a more general sense to training of unimpaired persons on the effects of the impairments, for example training of carers in respect of those for whom they care.

It is therefore an object for the present invention to provide apparatus for simulating visual impairment of a person. It is a further object for the present invention to provide a method of simulating visual impairment of a person.

STATEMENT OF INVENTION

According to a first aspect of the present invention there is provided apparatus for simulating visual impairment of a person, the apparatus comprising:
 a headset worn by a user, the headset displaying a scene to the user; and
 a position sensor sensing position of the headset,
 the headset changing: the scene displayed to the user in dependence on an output from the position sensor; and an extent of obscuration of the scene displayed to the user in dependence on an output from the position sensor.

The apparatus simulates visual impairment of a person. The apparatus comprises a headset which in use of the apparatus is worn by a user who is undertaking training to improve his or her appreciation of visual impairment of other persons or who is designing a living space for a visually impaired person.

The headset displays a scene to the user wearing the headset. The scene displayed may be a scene in 3 dimensions, for example a scene of a living space such as a room, to the user wearing the headset. The position sensor is operative to sense position of the headset. The apparatus may be operative to track position of the headset in dependence on output from the position sensor. The apparatus may track the position of the headset in respect of at least one of rotation and translation. Rotation may be in respect of at least one of pitch, yaw and roll. Translation may be in respect of at least one of x, y and z axes. For example, the displayed scene may change as the user moves by foot whereby there is translation of the headset. By way of further example, the displayed scene may change as the user rotates his or her head whereby there is rotation of the headset.

The apparatus is configured such that the headset changes an extent of obscuration of the displayed scene in dependence on an output from the position sensor. More specifically, the headset may change a spatial extent of obscuration of the displayed scene. The apparatus may be configured to change an extent of the displayed scene that is substantially obliterated. For example, the user may move his or her head to look in each of first and second directions with the displayed scene being obscured differently when the user looks in the first and second directions. In the context of living space design, the apparatus may be used to aid the like of appropriate location of furnishings in the living space and fitting of mobility aids in the living space.

Change in the displayed scene and change in the extent of obscuration of the displayed scene may depend on respectively different uses of output from the position sensor. For example, and as described in more detail below, change in the displayed scene may depend on tracking of rotation and translation whereas change in the extent of obscuration may depend on tracking of rotation only of rotation and translation.

The scene displayed by the headset may be a virtual scene. The headset may therefore comprise a display which displays the virtual scene to the user. The virtual scene may be stored in computing apparatus comprised in the apparatus for simulating visual impairment, the apparatus for simulating visual impairment being operative to display the stored scene to the user by way of the display.

The headset may be configured such that no real scene other than the inside of the headset is seen by the user when the headset is worn and in use. The headset may therefore be configured such that physical surroundings of the user are substantially unseen when the headset is worn and in use.

Change in extent of obscuration may comprise change in field of vision provided to the person by the headset. Change in field of vision may comprise reduction or increase of a boundary of the field of vision.

The apparatus may provide for change in field of vision provided by the headset in dependence on a subset of position information from the position sensor that provides for change in the displayed scene. More specifically, the apparatus may provide for change in the displayed scene in dependence on sensed rotation and sensed translation whereas the apparatus may provide for change in field of vision in dependence on sensed rotation only of sensed rotation and sensed translation.

The apparatus may provide for progressive change in field of vision provided by the headset in dependence on the output from the position sensor. The field of vision may change progressively with progressive change in headset position as sensed by the position sensor, such as progressive upward rotation or progressive downward rotation.

The field of vision may be reduced progressively as the headset is rotated at least one of progressively downwards and progressively upwards. More specifically, the field of vision may be reduced progressively as the headset is rotated progressively downwards and progressively upwards from being directed ahead. The field of vision may be reduced from an upper periphery of the display.

When the headset is rotated in the opposite direction, e.g. downwards after being rotated upwards, the field of vision may be increased.

Older persons often experience muscle loss which restricts range of movement with consequential loss in field of vision. By way of example, loss in the shoulder and neck muscle groups can limit the person's ability to raise his or her head; this is sometimes called dropped head syndrome.

Such limit in ability to raise his or her head can have the effect of the person being unable to see above a particular horizon. The apparatus for simulating visual impairment of a person according to the present invention may simulate such an effect. For example, and in the case of dropped head syndrome, the field of vision afforded by the headset may be reduced from a top of the headset with upward rotation of the user's head. Thus, although the user is able to rotate his or her head upwards, unlike someone with dropped head syndrome, the headset simulates the effect of dropped head syndrome by reducing the field of vision to mimic inability to see above a particular horizon.

The headset may comprise a display which is viewed by the user when the headset is worn. The headset may be configured to change a proportion of the whole area of the display which displays the scene to the user whereby there is a change in the proportion of the whole scene displayed to the user.

Change in extent of obscuration of the scene displayed by the headset may comprise changing a proportion of the whole area of the display which is operative to display the scene. Furthermore, changing a proportion of the whole area of the display which is operative to display the scene may comprise changing a proportion of the whole scene displayed to the user. Thus, change in extent of obscuration of the scene comprises changing a proportion of the whole scene displayed to the user rather than displaying the whole scene in less than the whole area of the display.

The display of the headset may comprise an upper visual field area and a lower visual field area. Change in extent of obscuration of the scene may comprise reducing an amount of the upper visual field area that is operative to display the scene. The display may be controlled to reduce the amount of the upper visual field area that is operative to display the scene from a distal edge of the upper visual field area. The distal edge of the upper visual field area may be a free edge whereby the distal edge is unbounded by any other part of the display. Progressive reduction in field of vision may therefore comprise an increase in the amount of the upper visual field area that is inoperative to display the scene from the distal edge of the upper visual field area towards a centre of the display.

Further increase in extent of obscuration of the scene may comprise increasing an amount of the lower visual field that is inoperative to display the scene whereby the reduction in field of vision increases beyond the centre of the display from the distal edge of the upper visual field area. At a furthest extent of upward direction of sight, substantially the whole display may be inoperative to display the scene.

When an extent of downward rotation of the headset, as sensed by the position sensor, is increased, the extent of upper visual field area which is inoperative to display the scene may increase. Thereafter and upon further increase in downward direction of sight, the extent of lower visual field area which is inoperative to display the scene may increase. At a furthest extent of downward direction of sight, more than half of the whole display may be inoperative to display the scene.

The display may comprise an array of pixels. The display may be controlled to be inoperative to display at least part of the scene by not operating pixels of the display. Alternatively or in addition, pixels of the display may be controlled to display an area of substantially uniform colour, such as of dark grey.

The apparatus may control the display of the headset such that at least one of saturation of the displayed scene and contrast of the displayed scene are lower than a level perceived by a visually unimpaired person and more specifically a level perceived by the average visually unimpaired person and more specifically the average visually unimpaired 40 year old person. The scene or partial scene seen by the user may therefore be of at least one of lower saturation and lower contrast. At least one of saturation and contrast may be lower irrespective of headset position.

Where one only of saturation and contrast is lower, contrast may be lower.

Where one of saturation and contrast is reduced to a greater extent than the other, contrast may be reduced to a greater extent than saturation.

At least one of saturation and contrast may not change in dependence on change in headset position. Saturation may be at least 40%, 50%, 60% or 65% lower than a level perceived by the visually unimpaired person. More specifically, and in preferred circumstances, saturation may be 70% lower. Contrast may be at least 60%, 70%, 80% or 85% lower than a level perceived by a visually unimpaired person. More specifically, and in preferred circumstances, contrast may be 90% lower.

The apparatus may be configured to change under user control between no reduction of at least one of saturation and contrast and reduction of at least one of saturation and contrast. The effect of visual impairment in respect of at least one of saturation and contrast may thus be appreciated by the user, such as during training or during living space design.

The position sensor may be a component apart from the headset. In use, the position sensor may be spaced apart from the headset. The position sensor may be positioned at a stationary location, such as on a table top. The output from the position sensor may be conveyed from the position sensor by way of a communication channel, such as a wired or wireless communication channel.

The apparatus for simulating visual impairment of a person may comprise computing apparatus. The computing apparatus may be general purpose computing apparatus, for example a Personal Computer such as a laptop.

The computing apparatus may store at least one scene to be displayed to a user of the apparatus. The headset may receive a stored scene from the computing apparatus for display of the received scene to the user.

The computing apparatus may receive the output from the position sensor. In addition, the computing apparatus may be configured to control the extent of obscuration in dependence on the received output from the position sensor. The computing apparatus may therefore be configured to control the headset to provide an according extent of obscuration of the scene displayed by the headset in dependence on the received output.

A scene to be displayed to a user of the apparatus may be user configured by way of the computing apparatus. The computing apparatus may therefore run a software application which provide for creation of scenes to be displayed and change of already created scenes. For example, a set of scenes may be created to represent a particular living space comprising plural interconnected rooms. By way of further example, a scene may be changed to assess the effect of different layouts of a living space or to assess the effect of different colour schemes.

According to a second aspect of the present invention there is provided a method of simulating visual impairment of a person, the method comprising:

displaying a scene to a user by way of a headset worn by the user;

sensing a position of the headset by way of a position sensor;

changing the scene displayed to the user in dependence on an output from the position sensor; and changing an extent of obscuration of the scene displayed by the headset in dependence on an output from the position sensor.

As described above, the method of simulating visual impairment of a person may be used to train a user to improve his or her appreciation of visual impairment of another person. The method of simulating visual impairment of a person may therefore be comprised in a method of training the user to improve his or her appreciation of visual impairment of another person. Alternatively, the method of simulating visual impairment of a person may be used to aid the user in designing a living space for a visually impaired person. The method of simulating visual impairment of a person may therefore be comprised in a method of designing a living space for a visually impaired person.

Further embodiments of the second aspect of the present invention may comprise one or more features of the first aspect of the present invention.

Further embodiments of the first or second aspect of the present invention may comprise one or more features of the fourth aspect of the present invention.

According to a further aspect of the present invention there is provided apparatus for simulating visual impairment of a person, the apparatus comprising: a headset worn by a user, the headset displaying a scene to the user; and a position sensor sensing a direction of sight of the user, the headset changing an extent of obscuration of the scene displayed by the headset in dependence on an output from the position sensor.

There are two components of direction of sight: head orientation and orientation of eyes in their sockets. Here, and as described above, the position sensor may sense a position of the headset, the position of the headset representing the direction of sight. The direction of sight may therefore take substantially no account of orientation of the eyes of the user in the user's eye sockets. Further embodiments of the further aspect of the present invention may comprise one or more features of the first aspect of the present invention.

According to a yet further aspect of the present invention there is provided a method of simulating visual impairment of a person, the method comprising: displaying a scene to a user by way of a headset worn by the user; sensing a direction of sight of the user by way of a position sensor; and changing an extent of obscuration of the scene displayed by the headset in dependence on an output from the position sensor. Embodiments of the yet further aspect of the present invention may comprise one or more features of the first or further aspect of the present invention.

According to a third aspect of the present invention there is provided a computer program comprising program instructions for causing a computer to control the headset and the position sensor of the second aspect of the present invention to perform the method according to the second aspect of the present invention.

The computer program may be one of: embodied on a record medium; embodied in a read only memory; stored in a computer memory; and carried on an electrical carrier signal. Further embodiments of the third aspect of the present invention may comprise one or more features of any other aspect of the present invention.

According to a fourth aspect of the present invention there is provided apparatus for simulating visual impairment of a person, the apparatus comprising:

a headset worn by a user, the headset displaying a virtual scene to the user; and a position sensor operative to sense a position of the headset, the headset changing the displayed virtual scene in dependence on an output from the position sensor, at least one of saturation and contrast of the displayed virtual scene being lower than a level seen by a visually unimpaired person, saturation and contrast substantially unchanging irrespective of the position of the headset as sensed by the position sensor.

The headset may comprise a display. The apparatus may control the display such that at least one of saturation of the displayed virtual scene and contrast of the displayed virtual scene are lower than a level perceived by a visually unimpaired person and more specifically a level perceived by the average visually unimpaired person, such as the average visually unimpaired 40 year old person. The headset may be configured such that no real scene other than the inside of the headset is seen by the user when the headset is worn and in use. The headset may therefore be configured such that physical surroundings of the user cannot be seen when the headset is worn by the user and in use.

The virtual scene seen by the user may therefore be of at least one of lower saturation and lower contrast. Saturation and contrast are substantially unchanged irrespective of the position of the headset as sensed by the position sensor. Saturation may be at least 40%, 50%, 60% or 65% lower than a level perceived by a visually unimpaired person. More specifically, and in preferred circumstances, saturation may be 70% lower. Contrast may be at least 60%, 70%, 80% or 85% lower than a level perceived by a visually unimpaired person. More specifically, and in preferred circumstances, contrast may be 90% lower.

The invention in the fourth aspect may provide for training of the user to improve his or her appreciation of visual impairment of other persons. Alternatively the invention in the fourth aspect may provide for design of a living space for a visually impaired person by, for example, informing the user of the effect of extent of contrast of colours and shades in the displayed virtual scene. By way of example, a visually unimpaired person will normally be able to distinguish a door from the surrounding wall irrespective of the colours and finishes of the door and surrounding wall. However, a visually impaired person who is suffering from at least one of reduced saturation and reduced contrast may be unable to distinguish the door from the surrounding wall even if they are of different colours and finishes. The present invention allows for the like of different colours to be used in the virtual scene displayed to the user whereby the user can sense if a visually impaired person would be able to visually perceive his or her environment to sufficient extent, such as for safe habitation of a living space where the virtual scene is of the living space.

Objects, such as floor and wall coverings in a living space, have respective light reflectance values (LRVs). The appearance of an object may be characterised by its LRV with sufficient difference in LRV of different objects providing for ease of distinguishing the objects from one another by a visually impaired person. The apparatus may therefore store an LRV for each of plural objects comprised in the virtual scene. When the user has arrived at a composition of virtual scene that meets requirements for visual perception by a visually impaired person, the LRVs for the plural objects comprised in the composed virtual scene may be used for selection of appropriate real objects having corresponding LRVs for use in the like of a real living space for the visually impaired person.

Further embodiments of the fourth aspect of the present invention may comprise one or more features of any previous aspect of the present invention.

According to a fifth aspect of the present invention there is provided a method of simulating visual impairment of a person, the method comprising:

displaying a virtual scene to a user by way of a headset worn by the user;

sensing a position of the headset by way of a position sensor; and changing the displayed virtual scene in dependence on the sensed position of the headset, at least one of saturation and contrast of the displayed virtual scene being lower than a level seen by a visually unimpaired person, saturation and contrast substantially unchanging irrespective of the headset position as sensed by the position sensor.

Where the method of simulating visual impairment of a person is comprised in a method of designing a living space for a visually impaired person, the method of designing a living space may comprise generating a light reflectance value for each of plural objects comprised in the displayed virtual scene. The method may further comprise generating object data identifying each of the plural objects, each of the plural light reflectance values being associated with a respective one of the plural object data. The generated object data and the generated light reflectance values may be provided to a supplier of real objects for use in a real living space. The generated object data and the generated light reflectance values may be provided to the supplier in a data carrier or by way of an electronic signal.

Further embodiments of the fifth aspect of the present invention may comprise one or more features of any previous aspect of the present invention.

According to a sixth aspect of the present invention there is provided a computer program comprising program instructions for causing a computer to control the headset and the position sensor of the fourth aspect of the present invention to perform the method according to the fourth aspect of the present invention.

The computer program may be one of: embodied on a record medium; embodied in a read only memory; stored in a computer memory; and carried on an electrical carrier signal. Further embodiments of the sixth aspect of the present invention may comprise one or more features of any other aspect of the present invention.

BRIEF DESCRIPTION OF DRAWINGS

Further features and advantages of the present invention will become apparent from the following specific description, which is given by way of example only and with reference to the accompanying drawings, in which:

FIG. 1 is a block diagram representation of apparatus according to the present invention.

DESCRIPTION OF EMBODIMENTS

A block diagram representation of apparatus 10 according to the present invention is shown in FIG. 1. The apparatus 10 comprises a laptop computer 12, a virtual reality headset 14, a position tracking sensor 16 and a motion controller 18. The laptop computer 12 is of conventional form and function subject to having sufficient processing capability and, in particular, sufficient graphics processing capability for the virtual reality headset 14. The virtual reality headset 14 and the position tracking sensor 16 are comprised in the Oculus Rift product from Oculus VR LLC of Menlo Park, Calif., USA. The motion controller 18 is a games controller of conventional form and function, such as an Xbox One controller, or the Oculus Touch from Oculus VR LLC.

The apparatus 10 is brought into use by positioning the position tracking sensor 16 at an appropriate location, such as on a table top, where it can track the position of the virtual reality headset 14 when the virtual reality headset 14 is in use. Furthermore, the virtual reality headset 14 is worn by the user. The virtual reality headset 14 comprises two OLED displays and is configured such that one of the OLED displays is seen by the right eye and the other of the OLED displays is seen by the left eye when the virtual reality headset 14 is worn. It is to be noted that the virtual reality headset 14 is designed such that the wearer cannot see the surrounding environment when the virtual reality headset 14 is worn. The wearer therefore only sees the inside of the virtual reality headset 14 and the two OLED display panels. The virtual reality headset 14 provides a virtual scene 20 in 3 dimensions, such as of a room, to the wearer by way of the OLED display panels. The virtual scene 20 is comprised in a virtual environment generated by the laptop computer 12. Movement of the virtual reality headset 14 is tracked by the position tracking sensor 16 whereby movement of the like of the head of the wearer provides for movement in the virtual environment with consequential change in the scene 20 of the virtual environment provided to the wearer by way of the OLED display panels. The motion controller 18 provides for movement through the virtual environment, such as movement within the present virtual room or from the present virtual room to another virtual room, with consequential change in the scene 20 of the virtual environment provided to the wearer by way of the OLED display panels. The virtual environment is developed on the laptop computer 12 by way of the Software Development Kit (SDK) which is provided by Oculus VR LLC as part of the Oculus Rift product and which is operative in conjunction with a game development engine, such as Unreal Engine from Epic Games, Inc. of Cary, N.C., USA, to provide for ease of development. Thus far, the form and function of the apparatus 10 is in accordance with known design and practice.

As is described in more detail below, the virtual environment presented to the wearer by way of the virtual reality headset 14 is modified in the present invention to simulate the effects of age related visual impairment. The effects fall into two categories: head movement dependent impairment; and impairment that is present irrespective of head movement.

In a general application of the present apparatus 10, simulation of the effects of age related visual impairment provides for training of visually unimpaired persons on the effects of the impairments, for example training of carers in respect of those for whom they care. The person undergoing training wears the virtual reality headset 14 and the apparatus 10 displays to the person undergoing training scenes 20 from a virtual reality environment representing a real environment inhabited by the visually impaired person or a real environment that the visually impaired person might inhabit. As will become apparent from the following description, the person undergoing training is thus able to gain an improved appreciation of diminished visual perception of the visually impaired person, such as in respect of being able to distinguish objects in the virtual environment from each other or in respect of suffering reduction in field of vision.

In a more specific application of the present apparatus 10, simulation of the effects of age related visual impairment provides for design of living spaces for visually impaired persons. Considering this latter application in more detail, the wearer of the virtual reality headset 14 can gain insight into the appropriateness of forms of living space for a visually impaired person and redesign the living space to better accommodate the visual impairment. For example, a first form of living space represented by the virtual environment displayed to the wearer of the virtual reality headset 14 may contain objects of insufficiently contrasting colour whereby the objects are not readily distinguished from one another. By way of further example, the first form of living space represented by the virtual environment may contain objects that are at an inappropriate location should the visually impaired person suffer reduction in field of vision. Having assessed the first form of living space for fitness for use by the visually impaired person and found there to be such shortcomings, the virtual environment may be modified by way of the SDK running on the laptop computer 12 to address the shortcomings to provide a second form of living space represented by the virtual environment which can then be assessed by way of the virtual reality headset 14. When design of the living space by way of the present apparatus 10 is complete, the real living space can then be created with reduced risk of the design of the real living space being inappropriate for the visually impaired person.

Simulation of the effects of age related visual impairment by way of the virtual environment presented to the wearer by the virtual reality headset 14 will now be described in more detail. As mentioned above, one category of effects relates to head movement dependent impairment. In this category, there is progressive reduction in field of vision presented by the virtual reality headset 14 to the wearer as the wearer moves his or her head. Reduction in field of vision involves reducing the proportion of the whole area of each OLED display panel that displays the scene 20 to the wearer whereby there is a reduction in the proportion of the whole scene displayed to the wearer. Each OLED display panel comprises an array of pixels. According to a first approach, the virtual reality headset 14 is controlled to effect reduction in field of vision by not actuating pixels of the display. According to a second approach, the virtual reality headset 14 is controlled to effect reduction in field of vision by actuating pixels such that all such actuated pixels are of substantially uniform dark colour, such as of dark grey. The remaining pixels of the OLED display panel are actuated such they together continue to display the scene 20 albeit the scene as now limited by the reduced field of vision. Progressive change in extent of reduction in field of vision depends on head movement and more specifically raising and lowering of the head of the wearer of the virtual reality headset 14 as sensed by the position tracking sensor 16. When the wearer looks straight ahead there is no reduction in field of vision whereby the whole scene 20 is presented to the wearer. As the wearer inclines his or her head progressively upwards, the field of vision is progressively reduced from an upper periphery of the OLED displays. At a furthest extent of upward inclination of the wearer's head, the field of vision is reduced such that substantially none of the scene 20 is presented to the wearer. As the wearer inclines his or her head progressively downwards, the field of vision is progressively reduced from an upper periphery of the OLED displays. At a furthest extent of downward inclination of the wearer's head, the field of vision is reduced towards the lower periphery of the OLED displays such that between 30% and 50% of the scene 20 is presented to the wearer. This category of effects is provided by modification of the virtual environment by way of the game development engine and SDK.

Another category of effects relates to impairment that is present irrespective of head movement. In this category, saturation of the virtual scene is 70% lower and contrast is 90% lower than saturation and contrast perceived by the average visually unimpaired 40 year old person. Saturation and contrast are reduced and maintained substantially constant irrespective of head movement as sensed by the position tracking sensor 16. This category of effects is provided by modification of the virtual environment by way of the game development engine and SDK.

As mentioned above, a visually impaired person suffering loss of saturation and contrast is liable to have difficulty in distinguishing objects from one another when the objects have finishes or colours of insufficient contrast. Objects, such as floor and wall coverings in a living space, have respective light reflectance values (LRVs). Relative LRVs of different objects are indicative of the ease with which such different objects can be distinguished from one another. Furthermore, if first and second objects are replaced with third and fourth objects having the same respective LRVs, the third and fourth objects will be distinguishable from each other with the same extent of ease with which the first and second objects can be distinguished from each other. When a design of the living space is settled upon as appropriate for the person with visual impairment, each object in the living space and its respective LRV is stored. The stored objects and their respective LRVs allow for subsequent change in the design in respect of selection of alternative objects, such as floor or wall coverings, having substantially the same LRVs as the stored LRVs. The design can thus be modified later and without compromising on its appropriateness for use by the visually impaired person.

The invention claimed is:

1. Apparatus for simulating visual impairment of a person, the apparatus comprising:
    a headset comprising a display which displays a virtual scene to a user when the headset is worn by the user; and
    a position sensor sensing position of the worn headset and providing an output of the position sensed, wherein
    the position sensed by the position sensor includes upward rotation, downward rotation, and translation of the worn headset,
    the headset displays a continuously changing virtual scene to the user in dependence on the output of the position sensed,
    the apparatus for simulating visual impairment of a person changes a spatial extent of obscuration of the continuously changing virtual scene displayed to the user and in dependence on the output of the position sensed, and
    change in the spatial extent of obscuration of the continuously changing virtual scene comprises operation of the display to progressively reduce a field of vision provided by the display to the user in dependence on progressive upward rotation of the user's head as sensed by the position sensor, the field of vision reducing progressively from a top of the display.

2. The apparatus according to claim 1, wherein the display is on an inside of the headset, the headset configured such that substantially no real scene other than the inside of the headset including the display is seen by the user when the headset is worn and in use.

3. The apparatus according to claim 1, wherein the headset changing progressively reduces a proportion of a whole area of the display which displays the continuously changing virtual scene to the user whereby there is progressive reduction in the proportion of the continuously changing virtual scene displayed to the user.

4. The apparatus according to claim 1, wherein the field of vision is reduced progressively from the top of the display with progressive downward rotation of the user's head as sensed by the position sensor.

5. The apparatus according to claim 1, wherein the display comprises an array of pixels, wherein the display is controlled such that plural pixels in the array of pixels are of substantially uniform colour whereby at least part of the continuously changing virtual scene is not displayed to the user to thereby effect the reduction in field of vision.

6. The apparatus according to claim 1, wherein the display is controlled such that at least one of saturation of the continuously changing virtual scene and contrast of the continuously changing virtual scene are lower than a level perceived by an average visually unimpaired 40-year-old person.

7. The apparatus according to claim 6, wherein at least one of the saturation and the contrast is lower irrespective of headset position as sensed by the position sensor.

8. The apparatus according to claim 6, wherein the saturation is at least 70% lower than a level perceived by the average visually unimpaired 40-year-old person.

9. The apparatus according to claim 6, wherein the contrast is at least 90% lower than a level perceived by the average visually unimpaired 40-year-old person.

10. The apparatus according to claim 1 further comprising computing apparatus, the computing apparatus storing at least one virtual scene to be displayed to a user of the apparatus, the headset receiving a stored virtual scene from the computing apparatus for display of the received virtual scene to the user.

11. The apparatus according to claim 10, wherein the computing apparatus receives the output of the position sensed, the computing apparatus controlling the spatial extent of obscuration in dependence on the output of the position sensed.

12. The apparatus according to claim 1, wherein changing the spatial extent of obscuration of the continuously changing virtual scene comprises operation of the display to incrementally reduce a field of vision provided by the display to the user in dependence on incremental upward rotation of the user's head as sensed by the position sensor, the field of vision reducing incrementally from a top of the display.

13. A method of simulating visual impairment of a person, the method comprising:

sensing by way of a position sensor a position of a headset worn by a user and providing an output of the position sensed, the position sensed by the position sensor including upward rotation, downward rotation, and translation of the worn headset;

displaying to the user by way of a display comprised in the worn headset a continuously changing virtual scene in dependence on the output of the position sensed; and changing a spatial extent of obscuration of the continuously changing virtual scene displayed to the user and in dependence on the output of the position sensed, wherein changing the spatial extent of obscuration of the continuously changing virtual scene comprises operation of the display to progressively reduce a field of vision provided by the display to the user in dependence on progressive upward rotation of the user's head as sensed by the position sensor, the field of vision reducing progressively from a top of the display.

14. A computer program embodied in a non-transitory record medium, comprising program instructions for causing a computer to control the headset and the position sensor of claim 13 to perform the method according to claim 13.

15. The method of claim 13, wherein changing the spatial extent of obscuration of the continuously changing virtual scene comprises operation of the display to incrementally reduce a field of vision provided by the display to the user in dependence on incremental upward rotation of the user's head as sensed by the position sensor, the field of vision reducing incrementally from a top of the display.

16. The method of claim 13, wherein the headset progressively reduces a proportion of a whole area of the display which displays the continuously changing virtual scene to the user whereby there is progressive reduction in the proportion of the continuously changing virtual scene displayed to the user.

17. The method of claim 13, wherein the display comprises an array of pixels, wherein the display is controlled such that plural pixels in the array of pixels are of substantially uniform colour whereby at least part of the continuously changing virtual scene is not displayed to the user to thereby effect the reduction in field of vision.

18. The method of claim 13, wherein the display is controlled such that at least one of saturation of the continuously changing virtual scene and contrast of the continuously changing virtual scene are lower than a level perceived by an average visually unimpaired 40-year-old person.

19. The method of claim 18, wherein at least one of the saturation and the contrast is lower irrespective of headset position as sensed by the position sensor.

20. The method of claim 13, wherein the output of the position sensed is received in computing apparatus, and the computing apparatus controls the spatial extent of obscuration in dependence on the received output of the position sensed.

* * * * *